US005575955A

United States Patent [19]
Caplan et al.

[11] Patent Number: 5,575,955
[45] Date of Patent: Nov. 19, 1996

[54] ELECTRICALLY CONDUCTIVE POLYIMIDE FILM CONTAINING GOLD (III) IONS, COMPOSITION, AND PROCESS OF MAKING

[75] Inventors: Maggie L. Caplan, Sun City West, Ariz.; Diane M. Stoakley; Anne K. St. Clair, both of Poquoson, Va.

[73] Assignee: The United States of America as represented by the Administrator of the National Aeronautics and Space Administration, Washington, D.C.

[21] Appl. No.: 281,804

[22] Filed: Jul. 22, 1994

[51] Int. Cl.$^6$ .............................. H01B 1/22; H01B 1/20; H01B 1/12; B05D 5/12

[52] U.S. Cl. ..................... 252/514; 427/125; 427/126.5; 106/403

[58] Field of Search ................................ 252/514, 519; 427/125, 126.5; 106/403

[56] References Cited

U.S. PATENT DOCUMENTS

| | | | |
|---|---|---|---|
| 3,528,950 | 9/1970 | Lubowitz | 260/78.4 |
| 4,519,941 | 5/1985 | Anderson | 252/514 |
| 4,859,530 | 8/1989 | Roark et al. | 428/294 |
| 5,395,650 | 3/1995 | Holl et al. | 427/125 X |
| 5,403,700 | 4/1995 | Heller et al. | 427/125 X |
| 5,538,789 | 7/1996 | Capote et al. | 252/514 X |

OTHER PUBLICATIONS

Madeleine, D. G., et al., "The Role of Colloid Formation, Imidization, and Aggregation in the Structure of BTDA–ODA Polymide Films Modified with Gold", *Journal of Polymer Science: Part B: Polymer Physics*, 26(8) (05 Aug. 1988), 1641–1655.

Caplan, Maggie L., et al., "Gold–Doped Polyimide Films for Space Applications", Polymeric Materials Science and Engineering, Proceedings of the American Chemical Society, pp. 400, 401.

*Encyclopedia of Polymer Science and Engineering*, John Wiley & Sons, Inc., 1988, vol. 12, pp. 364–383.

*Encyclopedia of Polymer Science and Engineering*, John Wiley & Sons, Inc., 1986, vol. 5, p. 643.

Kirk–Othmer, *Encyclopedia of Chemical Technology*, 3rd ed., 1982, vol. 18, pp. 704–719.

Taylor, L. T., et al., "Synthesis and Characterization of Conductive Metal–Containing Polyimide Films", *Organic Coatings and Plastics Chemistry*, 43(1980), 635–639.

Carver, V. C., et al., "Electrically Conductive Metal Containing Polyimide Films", *Organic Coatings and Plastics Chemistry*, 41, (1979), 150–153.

Madeleine, D., et al., "Surface analysis of Polymides doped with $Ha_uCl_4 \cdot 3H_2O$", Polymer Preprints, 26(1), Apr. 1985, pp. 92–93.

Madeleine, D. G., et al., "The influence of thermal processing on the ultimate structures and properties of gold containing polyimide films", Polmer Preprints, 28(1), Apr. 1987, pp. 110–111.

*Primary Examiner*—Douglas J. McGinty
*Attorney, Agent, or Firm*—George F. Helfrich

[57] ABSTRACT

An electrically conductive, thermooxidatively stable poltimide, especially a film thereof, is prepared from an intimate admixture of a particular polyimide and gold (III) ions, in an amount sufficient to provide between 17 and 21 percent by weight of gold (III) ions, based on the weight of electrically conductive, thermooxidatively stable polyimide. The particular polyimide is prepared from a polyamic acid which has been synthesized from a dianhydride/diamine combination selected from the group consisting of 3,3',4,4'-benzophenonetetracarboxylic dianhydride and 2,2-bis[4-(4-aminophenoxy)phenyl]hexafluoropropane; 3,3',4,4'-benzophenonetetracarboxylic dianhydride and 4,4'-oxydianiline; 2,2'-bis(3,4-dicarboxyphenyl)hexafluoropropane dianhydride and 4,4'-oxydianiline; and 3,3'4,4'-benzophenonetetracarboxylic dianhydride and 2,2-bis(3-aminophenyl)hexafluoropropane.

12 Claims, No Drawings

ELECTRICALLY CONDUCTIVE POLYIMIDE FILM CONTAINING GOLD (III) IONS, COMPOSITION, AND PROCESS OF MAKING

ORIGIN OF THE INVENTION

The invention described herein was jointly made by Government employees and by a contractor employee under a NASA contract and is subject to the provisions of Section 305 of the National Aeronautics and Space Act of 1958, as amended, Public Law 85-568 (72 Stat; 435; 42 USC 2457).

BACKGROUND OF THE INVENTION

1. Technical Field of the Invention

The present invention relates generally to polymeric films and coatings. It relates particularly to electrically conductive polyimide films and coatings which contain gold (III)ions.

2. Discussion of the Related Art

A need exists in the electronics industry for flexible, electrically conductive polymeric films and coatings. Metallized films may be obtained by a variety of processes including sputtering, electroplating, electroless plating and chemical vapor deposition. However, all of these approaches require pre-treatment of the surface to be metallized, and adhesive failures between the polymeric and metallic layers often occur.

An alternate approach to obtaining surface conducting polymeric films, such as polyimide films, is the dissolution of a soluble metal salt or complex in a polyamic acid or soluble polyimide resin with subsequent thermal treatment to provide a polymer film with a surface layer of reduced metal. However, this approach does not necessarily yield electrically conducting films. In addition, the thermal stability and mechanical properties of the film may be adversely affected by the incorporation of a metal additive.

Tetrachloroauric (III) acid has been added to polyamic acid resins and soluble polyimides by researchers in attempts to produce electrically conductive, flexible, tough, thermally stable films. A molar concentration of 1:4 (dopant: polyimide repeat unit) produced tough, flexible films with one side having a metallic gold appearance but not electrically conductive (Madeleine, D.; Spillane, S. and Taylor, L. T.; Polymer Preprints, 26(1), April 1985, pp. 92–93.) Raising the additive concentration to 1:2 produced a thicker, but still nonconductive gold surface layer (Madeleine, D. G.; Ward, T. C. and Taylor, L. T.; Polymer Preprints, 28(1), April 1987, pp. 110–111). Further work revealed some details of gold surface layer formation, but still failed to produce conductive films (Madeleine, D. G.; Ward, T. C. and Taylor, L. T.; Journal of Polymer Science, Part B, Polymer Physics, Vol. 26, pp. 1641–1655, 1988).

It is therefore a primary object of the present invention to produce an electrically conductive polyimide, especially an electrically conductive polyimide film.

Another object of the present invention is to provide an electrically conductive polyimide, especially a film thereof, with thermooxidative stability.

A further object of the present invention is to provide a method of making flexible, polyimide films which are both thermooxidatively stable and electrically conductive.

SUMMARY OF THE INVENTION

According to the present invention, a flexible gold-containing polyimide, especially a film, is provided which is electrically conductive and retains high thermooxidative stability.

A process for producing an electrically conductive, gold-containing polyimide film according to the present invention includes the following steps: (1) preparing a polyamic acid in a polar organic solvent; (2) adding a particular gold ion additive; (3) fabricating a thin film layer of the gold ion-containing polyamic acid resin by casting on or coating a substrate surface; and (4) imidizing the gold ion-containing polyamic acid to the gold-containing polyimide as by heating, for example, at 300° C.

DESCRIPTION OF THE PREFERRED EMBODIMENTS

According to the present invention, preparation of a gold ion-containing polyamic acid involves the addition of an equimolar quantity of a dianhydride to a stirred solution of a diamine in N,N-dimethylacetamide (DMAc). Dianhydrides investigated include 2,2-bis(3,4-dicarboxyphenyl) hexafluoropropane dianhydride (6FDA); 3,3',4,4'-benzophenonetetracarboxylic dianhydride (BTDA); and 1,4-bis(3,4-dicarboxyphenoxy)benzene dianhydride (HQDEA) (See Table 1). Diamines investigated include 4,4'-oxydianiline (4,4'-ODA); 2,2-bis[4-(4-aminophenoxy)phenyl]-hexafluoropropane (4-BDAF); 2,2-bis(3-aminophenyl) hexafluoropropane (6F); and 1,3-bis(aminophenoxy)benzene (APB) (See Table 2).

TABLE 1

Dianhydrides for Polyimide Synthesis

| Symbol | Chemical Structure | Purification | m.p., °C. |
|---|---|---|---|
| 6FDA | 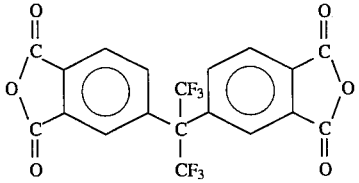 | Used as received | 240 |

TABLE 1-continued

Dianhydrides for Polyimide Synthesis

| Symbol | Chemical Structure | Purification | m.p., °C. |
|---|---|---|---|
| BTDA | | Used as received | 221 |
| HQDEA | | Used as received | 260 |

TABLE 2

Diamines for Polyimide Synthesis

| Symbol | Chemical Structure | Purification | m.p., °C. |
|---|---|---|---|
| 4,4'-ODA | | Recrystallized and sublimed | 188 |
| | | Used as received | 188 |
| 4-BDAF | | Recrystallized | 157 |
| 6F | | Recrystallized | 195 |
| APB | | Used as received | 107 |

Gold ion additive is added after a standard polyamic acid polymerization has gone to completion. The most satisfactory and consistent results are obtained with tetrachloroauric (III) acid, especially when the hygroscopic gold additive is dried, i.e., when the additive is placed in a drying pistol over boiling chloroform to drive off moisture, weighed and incorporated into the polyamic acid in a nitrogen atmosphere. The resulting doped polymeric solution varies in color from bright yellow to orange-brown, depending on the original resin color. Resins possessing an inherent viscosity before doping of at least 0.7 dL/g when measured at 0.5% solids in DMAc at 35° C. produce the best films. Although a variety of concentrations were tested and produced metallic film surfaces, a minimum of 17% gold in the cured polyimide film is required to produce an electrically conductive film surface.

Although the success of the present invention relies somewhat on the solubility of the gold additive in the polyamic acid solution, solubility alone does not guarantee that the film will have the desired properties. Over 15 different polyamic acid resins were employed in which the tetrachloroauric (III) acid was soluble. Properties of some polyimide films made from these doped resins are shown in Table 3. Most of the films had metallic surfaces, but a majority were either nonconductive or were very brittle. Best results were obtained with the BTDA/4-BDAF, BTDA/4,4'-ODA, 6FDA 4,4'-ODA, and BTDA/6F resin systems.

TABLE 3

$HAuCl_4$-Containing Polyimide Films

| Polyimide | % Gold | Electrical Properties | Handleability |
|---|---|---|---|
| 6FDA/4,4'-ODA | 21 | Conductive | Brittle, cracked |
| BTDA/4,4'-ODA | 17.3 | Conductive | Brittle, handleable |
| BTDA/4-BDAF | 17 | Conductive | Fingernail creasable |

TABLE 3-continued

HAuCl$_4$-Containing Polyimide Films

| Polyimide | % Gold | Electrical Properties | Handleability |
|---|---|---|---|
| BTDA/6F | 21 | Conductive | Fingernail creasable |
| BTDA/APB | 20 | Nonconductive | Fingernail creasable |
| 6FDA/APB | 20 | Nonconductive | Brittle |
| 6FDA/4-BDAF | 20 | Only edges conductive | Fingernail creasable |
| HQDEA/4,4'-ODA | 21 | Only edges conductive | Fingernail creasable |

The quantity of solvent used in preparing the Au/polyamic acid intermediate need only be sufficient to dissolve the monomers and metal species and provide a viscosity suitable for film casting. Successful results are obtained when the solvent comprises at least 85% of the Au/polyamic acid solution. Although DMAc was used as the solvent for the polymerizations in the specific examples below, other amide-type solvents may be employed, such as N-methyl-2-pyrrolidone (NMP), dimethylsulfone (DMSO), N,N-dimethylformamide (DMF), and ether-type solvents such as tetrahydrofuran, m- and p-dioxane, bis(2-methoxyethyl) ether or 1,2-bis(2-methoxyethoxy)ethane.

Table 4 shows structures and formula weights of a variety of gold-containing additives that have been incorporated into polyamic acid resins. Some of the additives produced films with a metallic appearance, but the desired electrical properties have only been achieved with the HAuCl$_4$ additive of the present invention.

TABLE 4

Gold Additives

| Name | Formula | Formula Weight (g/mol) |
|---|---|---|
| Tetrachloroauric (III) acid | HAuCl$_4$·3H$_2$O | 393.884 |
| Chloro(triethylphosphine) gold (I) | AuCl[(C$_2$H$_5$)$_3$P] | 350.578 |
| Phthalimido(triethylphosphine) gold (I) | 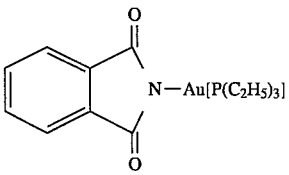 | 461.252 |
| Triethylphosphine gold (I) succinimide | 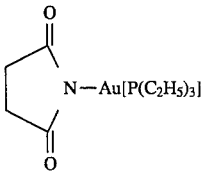 | 413.2 |

The quantity of gold (III) ions present in films described in the specific examples is expressed as the theoretical percent of gold present in the cured polyimide film. Concentrations of less than 17% gold have not produced electrically conductive films. According to the present invention, concentrations of 17–21% gold in certain polyimides produce films with surface conductivity generally greater than $9.1 \times 10^{-2}$ ohm$^{-1}$ over the entire side exposed to air during cure (air side).

The addition of HAuCl$_4$ to the polyimides has only a slight effect on the thermooxidative stability of the film as determined by dynamic thermogravimetric analysis (TGA). Table 5 shows the 10% weight loss temperature for the most successful doped polyimide films and their undoped counterparts.

TABLE 5

Thermooxidative Stability of HAuCl$_4$-Containing and Undoped Polyimide Films

| Polyimide | Theoretical % Au | TGA 10% Weight Loss, °C. |
|---|---|---|
| 6FDA/4,4'-ODA | 0 | 516 |
|  | 21 | 500 |
| BTDA/4,4'-ODA | 0 | 516 |
|  | 17.3 | 483 |
| BTDA/4-BDAF | 0 | 503 |
|  | 17 | 497 |
| BTDA/6F | 0 | 513 |
|  | 21 | 489 |

The gold ion-containing polymer solutions are cast into thin films by pouring onto soda-lime glass plates in an enclosed, dust-free, low-humidity area. Solutions are spread so as to ensure a final film thickness of approximately 1 mil. Although glass plates were used for film casting in the specific examples below, any flat surface may be used, such as Teflon, aluminum, or stainless steel. In the specific examples below, the Au/polyamic acid films of the present invention were cured in a forced air oven using a standard cure cycle of 1 hr each at 100°, 200°, and 300° C.

SPECIFIC EXAMPLES

EXAMPLE I

Preparation of the gold-containing polyamic acid of HAuCl$_4$+6FDA/4,4'-ODA was conducted at room temperature. A 15% solids stock solution of the polyamic acid 6FDA/4,4'-ODA was prepared by dissolving 5.0061 g (0.025 mole) of 4,4'-ODA in 91.3 g of DMAc in a flask flushed with dry nitrogen. Once the diamine was completely dissolved, 11.1062 g (0.025 mole) of 6FDA was added at once to the diamine solution while stirring. After five hours, the polyamic acid solution was brown in color and had an inherent viscosity of 0.77 dl/g when measured at 0.5% solids in DMAc at 35° C. To 1.00 g of this 6FDA/4,4'-ODA stock solution was added 0.1083 g of HAuCl$_4$, yielding a concentration of 21% Au in the cured film. Complete mixing of the metal species with the polymer was obtained after approximately 60 minutes of stirring.

A film of the HAuCl$_4$+6FDA/4,4'-ODA solution was cast on plate glass using an 18 mil blade gap and then placed overnight at room temperature in a low humidity enclosure. The film was cured the next day in a forced air oven using a cure schedule of one hour each at 100°, 200°, and 300° C. After slow cooling to room temperature, the film was soaked in water to remove it from the glass. The resulting gold-containing 6FDA/4,4'-ODA film cracked on cooling, was brittle, electrically conductive, and had metallic gold on the air side surface.

EXAMPLE II

Preparation of the gold-containing polyamic acid of HAuCl$_4$+BTDA4,4'-ODA was conducted as in Example I. To 5.0150 g of BTDA/4,4'-ODA solution (15% solids) was added 0.3969 g of HAuCl$_4$ to yield a cured polyimide film that was 17.3% gold, almost 4% lower than the film in Example I. A film of this material was cast, cured and removed from the glass plate as in Example I. The cured film was metallic gold and electrically conductive on the air side. It did not crack during cooling, and was significantly more handleable than the film in Example I, but did crack when creased by fingernail.

EXAMPLE III

Preparation of the gold-containing polyamic acid of HAuCl$_4$+BTDA/6F was conducted as in Example I. To 4.9900 g of BTDA 6F solution (15% solids) was added 0.5479 g of HAuCl$_4$ to produce a cured polyimide film that was 21% gold, the same concentration as in Example I. A film of this material was cast 0.015" thick, then cured and removed from the glass plate as in Example I. The polyimide film had an electrically conductive and metallic gold air side, as did the film in Example I, but this film was fingernail creasable.

EXAMPLE IV

Preparation of the gold-containing polyamic acid of HAuCl$_4$+BTDA/4BDAF was conducted as in Example I. To 19.9834 g of BTDA 4-BDAF solution (15% solids) was added 1.5524 g of HAuCl$_4$ to yield a cured polyimide film that was 17% gold, 4% lower than the film in Example I. A film of this material was cast, cured, and removed from the glass plate as in Example I. The polyimide film had an electrically conductive, metallic gold air side, and this film was fingernail creasable.

As is understood by those of skill in the art, the present invention has been described in detail with respect to certain preferred embodiments thereof. Variations and modifications of this detail are possible without departing from the spirit and scope of the present invention, which is defined in the hereto-appended claims.

We claim:

1. An electrically conductive, thermooxidatively stable polyimide comprising an intimate admixture of the following components:

a polyimide synthesized from a dianhydride/diamine combination selected from the group consisting of 3,3',4,4'-benzophenonetetracarboxylic dianhydride and 2,2-bis[4-(4-aminophenoxy)phenyl]hexafluoropropane; 2,2'-bis 3,4-dicarboxyphenyl)hexafluoropropane dianhydride and 4,4'oxydianiline; and 3,3',4,4'-benzophenonetetracarboxylic dianhydride and 2,2-bis(3-aminophenyl)hexafluoropropane; and gold (III) ions in an amount sufficient to provide between about 17 and 21 percent by weight of gold (III) ions, based on the weight of the electrically conductive, thermooxidatively stable polyimide.

2. A film prepared by a processor of applying the electrically conductive, thermooxidatively stable polyimide of claim 1 to a substrate.

3. The electrically conductive, thermooxidatively stable polyimide of claim 1, wherein tetrachloroauric (III) acid is employed to provide the gold (III) ions.

4. The film of claim 2, wherein tetrachloroauric (III) acid is employed to provide the gold (III) ions.

5. A process for preparing an electrically conducting, thermooxidatively stable polyimide film, which process comprises:

preparing a solution of a polyamic acid in a polar organic solvent by reacting in a polar organic solvent a dianhydride/diamine combination selected from the group consisting of:

3,3',4,4'-benzophenonetetracarboxylic dianhydride and 2,2-bis[4-(4-aminophenoxy)phenyl]hexafluoropropane; 2,2'-bis(3,4-dicarboxyphenyl)hexafluoropropane dianhydride and 4,4'-oxydianiline; and 3,3', 4,4'-benzophenonetetracarboxylic dianhydride and 2,2-bis(3-aminophenyl)hexafluoropropane;

adding to the solution of the polyamic acid in the polar organic solvent gold (III) ions in an amount sufficient to provide between about 17 and 21 percent by weight of gold (III) ions, based on the weight of the electrically conducting, thermooxidatively stable polyimide film;

fabricating a film layer of the solution of the polyamic acid in the polar organic solvent containing gold (III) ions on a surface of a substrate;

imidizing the film layer and recovering a gold (III) ion-containing polyimide film from the substrate.

6. The process of claim 5, wherein tetrachloroauric (III) acid is employed to provide the gold (III) ions.

7. The process of claim 6, wherein the tetrachloroauric (III) acid is freed of moisture before it is added to the solution of the polyamic acid in the polar organic solvent.

8. The process of claim 7, wherein the tetrachloroauric (III) acid which has been freed of moisture is added to the solution of the polyamic acid in the polar organic solvent in an inert gas atmosphere.

9. The process of claim 8, wherein the polar organic solvent is selected from the group consisting of amide-type solvents and ether-type solvents.

10. The process of claim 9, wherein the film layer of the solution of the polyamic acid in the polar organic solvent containing gold (III) ions is fabricated by casting onto a plate in an enclosed, dust-free, low-humidity.

11. The process of claim 10, wherein the film layer is imidized thermally to form a gold (III) ion-containing polyimide film.

12. The process of claim 11, wherein the film layer is heated to a temperature of about 300° C.

* * * * *